Patented Apr. 14, 1942

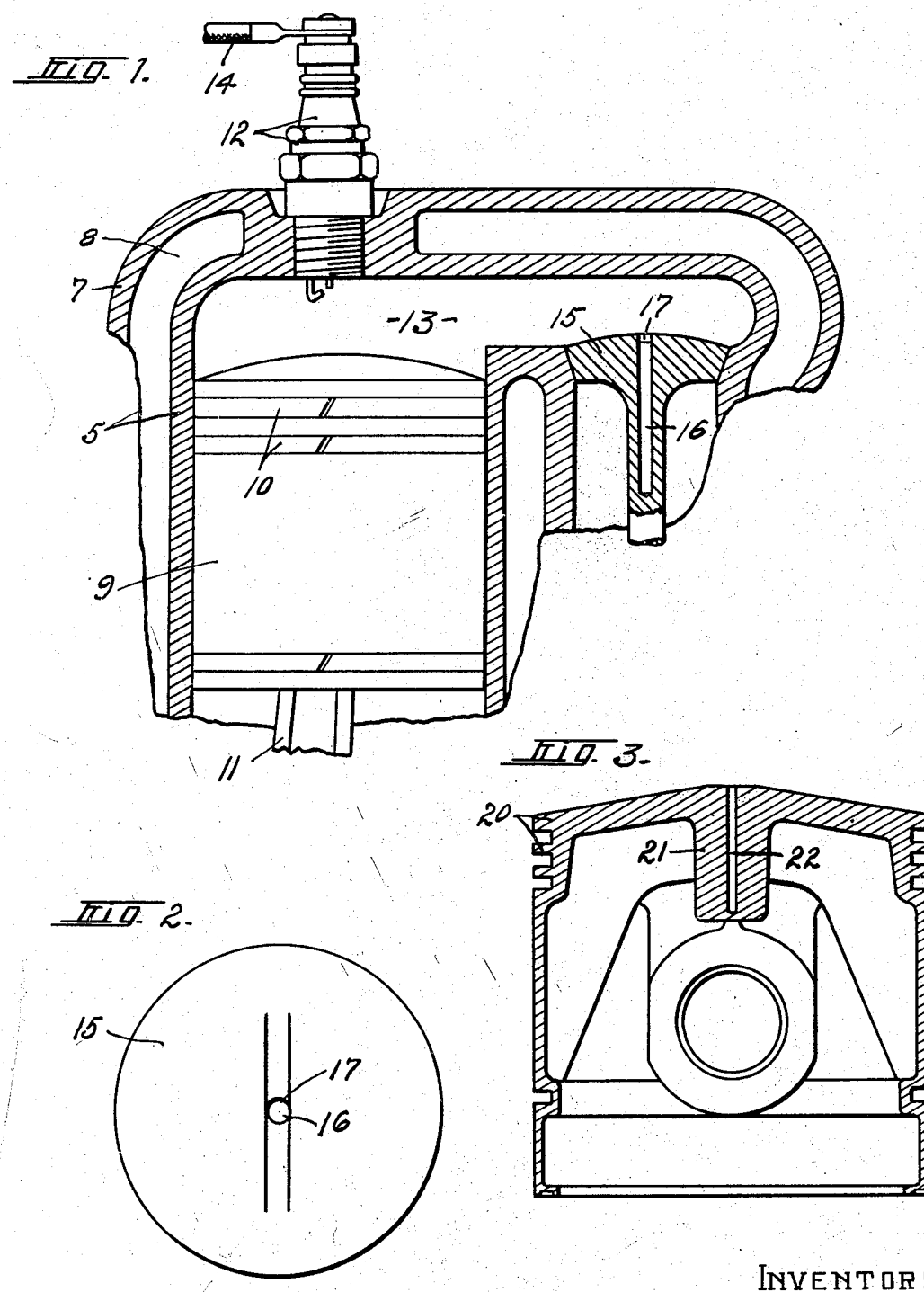

2,279,709

UNITED STATES PATENT OFFICE 2,279,709

IGNITION SYSTEM FOR INTERNAL COMBUSTION ENGINES

Philip Louis Kite and Robert Emert La Mondia, Syracuse, N. Y., assignors of one-third to Eric W. Will, Syracuse, N. Y.

Application October 10, 1940, Serial No. 360,632

12 Claims. (Cl. 123—143)

Our invention is concerned with an auxiliary ignition device for use in an internal combustion engine.

The modern gasoline or carburetor gas engine is based on the Otto cycle, originally suggested by Beau de Rochas. In this type of engine, the elements are a crank case in which is journaled a crank, a cylinder suitably fastened to said crank case or cast integrally therewith, a piston slidable in said cylinder, a connecting rod joining said piston with the crank shaft, inlet and exhaust valves communicating with the combustion chamber above the piston, a cam shaft and connections for operating said valves in timed relation with said piston, and usually an electric spark ignition system, including a spark plug in said combustion chamber, said spark system being timed by suitable means to ignite the explosive mixture in the combustion chamber. Liquid or gaseous fuel is mixed with air in a carburetor and admitted to the combustion chamber in explosive proportions.

In the four stroke cycle engine, the steps of operation are:

1. *Intake.*—The inlet valve is opened, the piston moves outward sucking air and fuel through the carburetor to charge the cylinder with an explosive mixture. At or near the end of the intake stroke the inlet valve closes.

2. *Compression.*—The piston moves inward, both inlet and exhaust valves remain closed, the charge is compressed to about 6 atmospheres.

3. *Work stroke.*—At or slightly in advance of the point when the piston reaches the inner limit of its stroke, an electric spark is produced at the spark plug, which ignites the explosive mixture in the combustion chamber over the piston. The consequent explosion, accompanied by increase of temperature and pressure, causes the gases contained in the combustion chamber and cylinder to expand, forcing the piston outwardly to perform work in rotating the crank shaft.

4. *Exhaust.*—At or near the end of the working stroke, the exhaust valve is opened, permitting the gas in the cylinder to escape to atmosphere. On the inward stroke of the piston, the gases are forced out of the cylinder.

At the end of the exhaust stroke, the exhaust valve closes, the inlet valve opens and the cycle repeats.

In the two stroke cycle, the series of operations is compressed into two strokes of the piston.

In either the two or four stroke cycles, ignition of the explosive charge is obtained by means of an electric spark. Failure of the spark ignition results in a stoppage of the engine. Failure may occur from a defect in the ignition coil or magneto, if one is used, in the battery or wiring. In automotive or airplane engines, rain or spray wetting the electrical ignition system may cause failure of operation due to a short circuit.

One of the objects of our invention is to provide an auxiliary means for igniting the explosive charge in an internal combustion engine as a supplement to the regular spark ignition.

Another object of our invention is to provide a means for igniting the explosive charge in an Otto cycle internal combustion engine that is independent of the electrical ignition system and will continue to function after the electrical ignition is cut off either accidentally or otherwise.

A still further object of our invention is to provide an ignition chamber in an Otto cycle internal combustion engine as a supplement and auxiliary to the regular electrical ignition system.

Another object of our invention is to provide an ignition chamber for an Otto cycle internal combustion engine which is so constructed and arranged as to time the auxiliary ignition by the proportions of said chamber.

Other objects and advantages of our invention will become apparent from the following specification and drawing, in which:

Figure 1 is a section, parts being broken away, through an internal combustion engine of the Otto cycle type provided with an ignition chamber of our invention located in the exhaust valve.

Figure 2 is a plan view on an enlarged scale of the exhaust valve of the engine of Figure 1.

Figure 3 is a sectional view of a piston adapted for use with a conventional internal combustion engine of the Otto cycle type, showing the location of the ignition chamber of our invention in said piston.

Referring now more particularly to the drawing, 5 is a cylinder of an Otto cycle internal combustion engine of the L-head type. 7 is an outer wall surrounding the cylinder and head enclosing water jacket 8. The piston 9 slidably mounted within the cylinder 5 is equipped with the conventional piston rings 10. Connecting rod 11 is rotatably secured to the piston 9 by means of the conventional wrist pin and bearing (not shown), the large end of the connecting rod being rotatably fastened to the crank shaft of the engine (not shown). 12 is a conventional spark plug mounted in the cylinder head with the sparking elements positioned within the combustion chamber 13. The spark plug 12 is connected by means of wire 14 to the high tension side of a conventional electric ignition system. 15 is an exhaust valve which functions in the usual manner but is provided with a relatively long narrow recess or ignition chamber 16, the mouth 17 of which communicates with the combustion chamber.

In the preferred form, the recess 16 is cylindrical and in experiment we have used a diameter of 3/16 of an inch and a depth ranging from 1/2 inch to 1 1/2 inches in particular engines, although we do not wish to be limited by these particular dimensions because suitable dimensions vary with the size of cylinder and the ratio of compression. Furthermore, the location of the recess 16 may be other than in the exhaust valve, for example, it may be located in the piston, the location of the recess 16 being a matter of choice for reasons that will be developed later.

The engine is started using the conventional ignition system including the spark plug 12. After the engine has operated a sufficient time to become hot, the spark ignition may be turned off and the recess 16 will function as an ignition chamber to maintain firing in the cylinder. We have found that the depth of the chamber 16 has a definite effect both on maintaining ignition and on the timing of the ignition. With a chamber 16 approximately 3/16 of an inch in diameter and 1/2 inch in depth and with a particular engine, we have found that ignition can be maintained by means of the chamber 16 at a comparatively high rotative speed in the neighborhood of about 2000 R. P. M., and that by increasing the depth of the chamber 16 to 7/8 of an inch, ignition can be maintained at a lower rotative speed of approximately 1250 R. P. M. By increasing the depth of the chamber 16 to 1 1/8 inches, satisfactory ignition was maintained at rotative speeds as low as approximately 750 R. P. M. If the engine speed is allowed to drop below the values indicated, ignition becomes faulty and if the speed is dropped low enough, ignition fails altogether and the engine stops. We have found that by changing the proportions of the ignition chamber 16, the timing of the explosion in the cylinder and also the speed at which ignition can be maintained is affected. If the ignition chamber 16 is made too deep, say 1 1/2 inches with the particular engine just mentioned, the timing of the ignition becomes too late and the engine does not operate properly when the electric ignition system is switched off.

It will be noted that in the engine illustrated in Figure 1, the spark plug 12 is located above the piston 9 and hence at a point in the combustion chamber 13 remote from the ignition chamber 16, which is located in the exhaust valve 16. We prefer such a spaced arrangement of the spark plug and our ignition chamber, as by so doing, we can obtain the well recognized advantages of dual ignition while operating with the conventional spark ignition.

Where it is desired to apply our invention to an internal combustion engine of the type in which the spark plug is located directly over the exhaust valve, the spaced arrangement above described can be obtained by employing the modification of our invention illustrated in Figure 3. The piston 20 of Figure 3 may be conventional in construction except that it is provided with a central boss 21 in which is located the ignition chamber 22 of our invention. The ignition chamber 22 may be similar to the chamber 16 above described.

Although it has not been possible to observe just how the ignition chamber of our invention accomplishes its result, it is believed that the following theory may account for the phenomenon: After firing the engine by means of the electrical ignition system, a quantity of the products of combustion at high temperature is forced into the ignition chamber and there retained during the exhaust and intake strokes. As the fresh charge of explosive mixture is compressed, it is eventually forced down into the ignition chamber to be ignited by the hot gas contained therein when compression has reached a sufficient pressure. By changing the depth of the ignition chamber, the conditions of ignition are achieved at a desired point in the cycle.

It will be observed from the foregoing that the ignition chamber of our invention not only supplements and improves the ignition obtained when operating with the conventional electric spark ignition, but also provides an auxiliary ignition system capable of taking over and continuing the ignition of the successive charges without the use of the electric ignition after the engine has once been placed in operation with the electric ignition and so long as the engine speed is not throttled down below a rotative speed which is predetermined by the design of the ignition chamber and which may be an ordinary idling speed. In the event of failure of the electric ignition system while the engine is operating, therefore, our invention permits the continued operation of the engine. This is a safety feature of great value in airplane engines, and also of considerable value in automotive engines, as it lessens the likelihood of being forced to discontinue a trip because of such mishaps as wetting of the ignition wires during a rainstorm or while fording a stream or the like.

Although we have specifically described our invention and the best modes now known to us for carrying it into effect, it will be evident to those skilled in this art that various changes and modifications might be made without departing from the spirit of our invention. Thus, our invention may be applied to other types of internal combustion engines than the L-head engine illustrated in Figure 1, and the shape, size and location of our ignition chamber is subject to considerable variation. It is by no means essential that our ignition chamber be located either in the exhaust valve or in the piston, although we prefer these locations, so long as it is in a portion of the engine which is maintained sufficiently hot during operation and so long as it communicates freely with the combustion chamber.

We desire to be limited, therefore, only by the prior art and the scope of the appended claims.

We claim:

1. In an Otto cycle internal combustion engine having a cylinder, a movable piston therein, a combustion chamber communicating with said cylinder and means for igniting an explosive charge in said combustion chamber, in combination, an auxiliary independent self-ignition device comprising a separate ignition chamber in open communication with said combustion chamber at all times and heated solely by the products of combustion in said combustion chamber.

2. In an Otto cycle internal combustion engine having a cylinder, a movable piston therein, a combustion chamber communicating with said cylinder and means for igniting an explosive charge in said combustion chamber, in combination, an auxiliary independent self-ignition device comprising a separate relatively long narrow ignition chamber closed at one end and openly communicating at its other end with said combustion chamber heated solely by the products of combustion from said combustion chamber.

3. In an Otto cycle internal combustion engine having a cylinder, a movable piston therein, a combustion chamber communicating with said cylinder and means for igniting an explosive charge in said combustion chamber, in combination, auxiliary means for maintaining ignition in said combustion chamber comprising a separate cylindrical self-ignition chamber of relatively small diameter openly communicating with said combustion chamber and being heated solely by the products of combustion from said combustion chamber, said self-ignition chamber having a depth of from three to seven times its diameter.

4. In a carburetor type internal combustion engine having a combustion chamber, a timed device for igniting an explosive charge therein and exhaust and inlet valves communicating with said combustion chamber, in combination, an auxiliary self-ignition device comprising a cylindrical recess in said exhaust valve, one end of said recess being closed, the other end of said recess openly communicating through the head of said valve with said combustion chamber.

5. In an internal combustion engine having a combustion chamber designed for burning a gaseous or vaporous mixture and having a timed electrical ignition system for firing the mixture, in combination, a supplementary ignition device operable independently of said electrical ignition system comprising a narrow, relatively deep recess communicating with said combustion chamber, said recess being open at all times to said combustion chamber and wherein said recess is located so as to be maintained at high temperature solely by the heat of the explosion in said engine.

6. In an Otto cycle internal combustion engine having a cylinder, a movable piston therein, a combustion chamber communicating with said cylinder and electrical means for igniting an explosive charge in said combustion chamber, in combination, a self-ignition device comprising a cylindrical recess, one end being in open communication with said combustion chamber, the opposite end of said recess being closed, the diameter of said recess being relatively small and of the order of $\tfrac{1}{16}$ths of an inch; the depth of said recess being from three to seven times its diameter, and the depth of said recess being predetermined to secure a desired timing of said self-ignition device.

7. In an internal combustion engine having a combustion chamber designed for burning a gaseous or vaporous mixture where said mixture is of explosive proportions when drawn into said combustion chamber and during compression thereof, and an electrical ignition system for starting said engine, in combination, an independent self-ignition device capable of firing said engine when said engine is hot and said electrical ignition system is rendered inoperative either intentionally or otherwise, said self-ignition device comprising a narrow, relatively deep recess heated solely by the heat of combustion in said combustion chamber and communicating with said combustion chamber at all times, wherein the width of said recess is sufficiently small so that compression of a fresh explosive charge in said combustion chamber forces a portion of said charge into said recess to compress the products of combustion remaining therein without substantial mixing of said fresh charge with said remaining products of combustion, whereby the heat of compression plus the heat remaining in said products of combustion is sufficient to ignite the entering fresh charge.

8. In an internal combustion engine having a combustion chamber designed for burning a gaseous or vaporous mixture where said mixture is of explosive proportions when drawn into said combustion chamber and during compression thereof, and an electrical ignition system for starting said engine, in combination, an independent self-ignition device capable of firing said engine when said engine is hot and said electrical ignition system is rendered inoperative either intentionally or otherwise, said self-ignition device comprising a cylindrical recess heated solely by the heat of combustion in said combustion chamber and communicating with said combustion chamber at all times, wherein the diameter of said recess is sufficiently small so that compression of a fresh explosive charge in said combustion chamber compresses the products of combustion remaining in said recess and raises the temperature of said compressed products of combustion above the ignition temperature of said fresh charge.

9. In an internal combustion engine wherein an explosive mixture is first compressed in a combustion chamber of said engine and then fired by an electric ignition device, in combination, an independent self-ignition device for maintaining timed firing of said engine after said engine is started and after said electrical ignition system ceases to function, said device comprising a narrow, relatively deep, dead end recess communicating with said combustion chamber at all times, said recess being of a width sufficiently small to maintain the products of combustion trapped therein at a relatively high temperature when a fresh charge of explosive mixture is forced into said recess during compression, whereby the heat contained in said trapped gases and the heat of compression combine to raise the temperature in said recess high enough to ignite the entering fresh charge.

10. A device as described in claim 9 wherein said engine is provided with a combustion chamber and inlet and exhaust valves communicating therewith, and wherein said self-ignition device is located in said exhaust valve.

11. In an internal combustion engine of the type wherein an explosive mixture is first compressed in a combustion chamber and then fired by means of an electric spark, in combination, a self-ignition device entirely independent of said electric ignition, said self-ignition device being so constructed and arranged as to maintain ignition in said engine at or above a predetermined engine speed and to cease to function below said predetermined engine speed, said self-ignition device comprising a cylindrical recess opening from said combustion chamber, said recess being of such small diameter as to maintain the temperature of gases trapped therein relatively high during the entry of a fresh charge of explosive mixture into said recess, and said recess being of such depth as to trap a quantity of gas containing a sufficient amount of heat so that the heat of compression and the heat of the entrapped gas is sufficient to ignite the entering fresh charge at or above the predetermined engine speed.

12. A device as described in claim 11 wherein said engine is provided with a combustion chamber and inlet and exhaust valves communicating therewith, and wherein said self-ignition device is located in said exhaust valve.

PHILIP LOUIS KITE.
ROBERT EMERT LA MONDIA.